Jan. 24, 1939. L. C. BROECKER 2,145,218
VALVE STEM
Filed Dec. 9, 1933 2 Sheets-Sheet 1
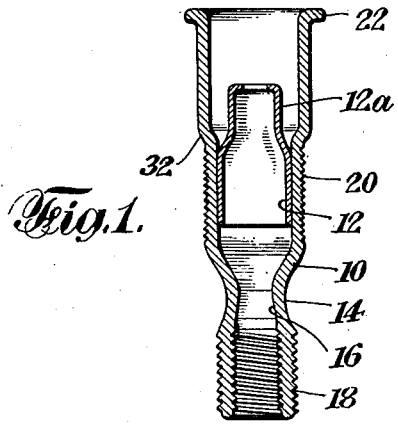
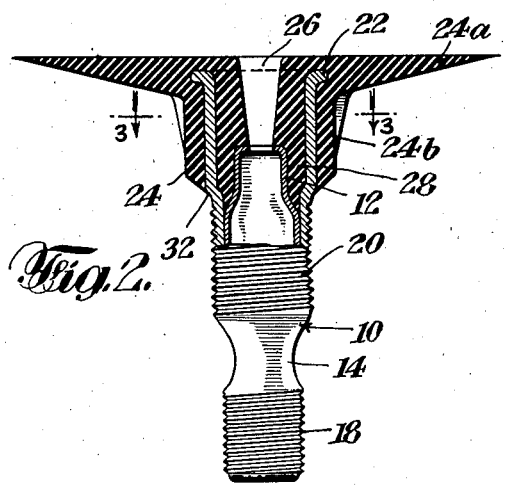
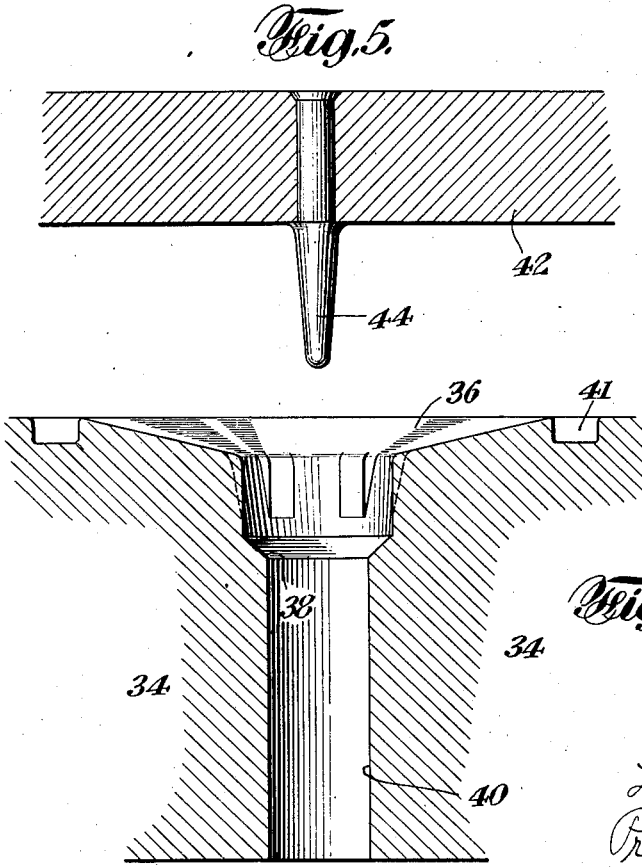
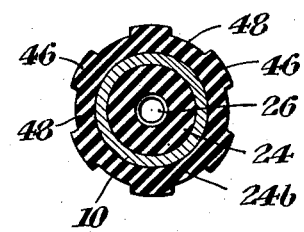
INVENTOR
Lewis C. Broecker
BY
Prindle, Bean & Mann
ATTORNEYS Jan. 24, 1939. L. C. BROECKER 2,145,218
VALVE STEM
Filed Dec. 9, 1933 2 Sheets-Sheet 2
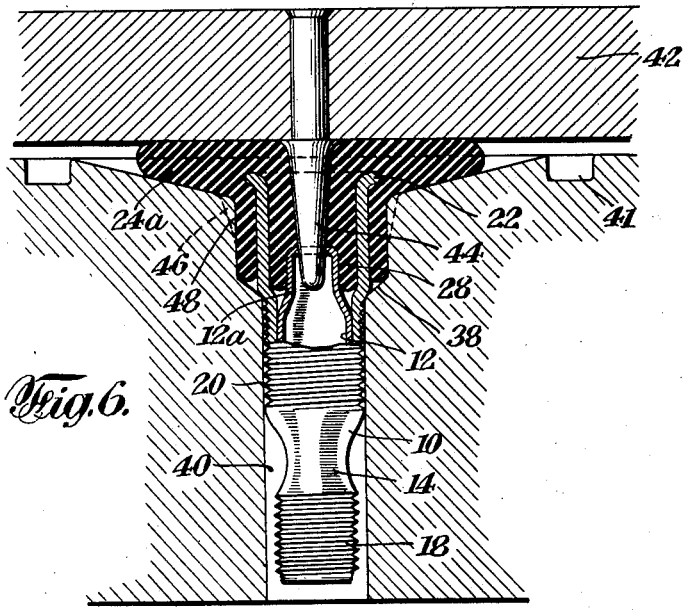
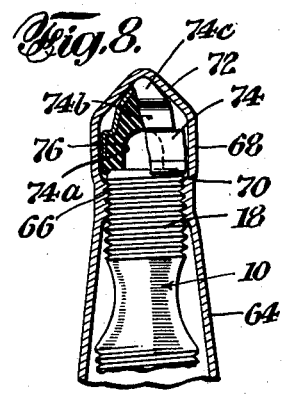
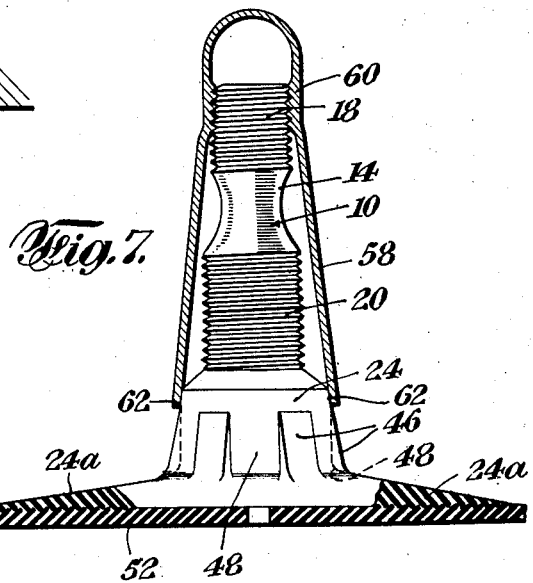
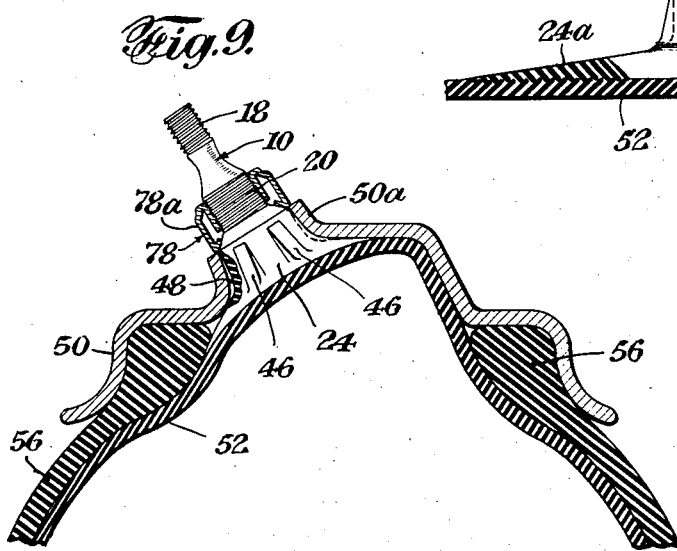
INVENTOR
Lewis C. Broecker
BY
Prindle, Bean & Mann
ATTORNEYS Patented Jan. 24, 1939

2,145,218

UNITED STATES PATENT OFFICE 2,145,218

VALVE STEM

Lewis C. Broecker, Bridgeport, Conn., assignor to Bridgeport Brass Company, Bridgeport, Conn., a corporation of Connecticut Application December 9, 1933, Serial No. 701,588

2 Claims. (Cl. 152—427)

My invention relates to improvements in composite valve-stems comprising a metal tubular portion integrated with a rubber-base portion. The rubber-base portion serves to secure the valve-stem as by vulcanizing, to the inner tube of a tire or to any other suitable article wherever usable. According to my invention the novel construction by which the rubber-base is secured to the valve-stem tube provides not only a rugged air-tight connection between the parts in the first instance, but thereafter automatically maintains said connection during use and operation of the valve-stem.

The object of my invention is to provide a valve-stem having the advantages of the composite stem over the all-metal stem but without its disadvantages.

Another object is to provide an improved form of dust cap usable with the composite valve-stem.

I will now describe a preferred form of valve-stem within my invention together with a preferred method of making same, it being understood that these are put forward in illustration of the invention, but without necessarily limiting it to unessential details thereof. In this description I will refer to the accompanying drawings illustrative of my invention. In these:

Fig. 1 is a longitudinal section through the metal part of the stem;

Fig. 2 is a longitudinal section partly in elevation, of the metal part of the stem and of the rubber-base which has been applied thereto;

Fig. 3 is a cross sectional view through the composite stem on the line 3—3 in Fig. 2 looking in the direction of the arrows;

Figs. 4 and 5 are diagrammatic fragmentary views in vertical section of the parts of a mold for molding the rubber-base onto the metal part of the valve stem;

Fig. 6 shows the metal part of the valve-stem within the mold in the act of molding the rubber compound into place with the parts approaching fully closed position;

Fig. 7 shows the completed valve-stem vulcanized to an inner tube, of which latter only a portion is shown, this figure also serving to illustrate a novel form of dust cap of my invention;

Fig. 8 is a fragmentary view to show a modification of the construction shown in Fig. 7 in the respect of providing a valve-stem engaging washer in the closed end of the dust-cap; and Fig. 9 is a partial cross sectional view of a wheel-rim and of a tire-casing or shoe and an inner tube equipped with my composite valve-stem held in place by a rim-nut.

Proceeding now with the description, Fig. 1 shows a metal valve-stem tube 10 containing an axially apertured shield 12 extending across the bore of the tube. The tube may be drawn from tubing or sheet metal but can also be machined from solid stock. The neck 14 may be reduced and formed by a rolling or pressing operation to provide for the formation of the usual taper seat 16 for engagement with the valve insides not shown. The screw threaded end 18 is the nipple or outer portion of the valve-stem. The screw threads 20 are on the body portion of the tube. The basal end of the tube may be spread or flanged outwardly as shown at 22 to improve its anchorage in the vulcanized soft or flexible rubber-base 24, which as shown in Fig. 2, is molded and vulcanized inside and out onto the basal end of the tube 10.

The aforesaid shield member 12 in the particular form shown is a separate piece inserted into the valve-stem tube; and is tubular and is adapted to be drawn from thin sheet brass. This particular form of the member 12 serves the dual purpose of providing a rest or abutment for the spring foot of the so-called long type of valve inside as well as serving as a stopping-off barrier or shield for the rubber compound within the valve-stem tube when molding the rubber base thereto, as will hereinafter appear. This tubular insert 12 is made slightly larger than the inside diameter of the coacting portion of the valve-stem tube so that it is securely held in place by the frictional grip between it and the inside of the tube after the insert has been pressed therein.

It is not necessary to illustrate the valve insides in connection with the valve-stem, since the valve insides may embody any well known or preferred construction whether of the so-called long or short types or otherwise.

Fig. 2 shows the rubber-base 24 molded to the lower portion of the valve-stem tube 10 inside and out. This rubber base has an axial hole 26 through it communicating with the bore of the tubular insert or shield 12. Further the rubber compound within the tube at 28 is shielded or stopped by the insert 12 from extending farther into the valve-stem. For this purpose, this particular form of shield has a portion 12a extending toward the base of the valve-stem tube which is reduced in diameter so that it is separated from the inside of the valve-stem tube by an annular space into which the rubber-base extends at 28.

The outside of the valve-stem tube 10 is formed with an annular shoulder 32 and the rubber-base material on the outside of the tube extends up to this shoulder as indicated in Fig. 2.

The rubber-base is provided with an outwardly flanged foot portion in the form of a disc 24a which tapers to a thin edge.

A suitable mold for molding and curing the rubber-base 24 onto the metal valve-stem tube may consist of two parts shown diagrammatically by the cross sectional views of said parts, Figs. 4 and 5. Fig. 6 shows the mold parts in use with the mold in the act of being closed.

The mold part 34 shown in Fig. 4 contains a mold cavity 36 having the general external form of the rubber-base. Further it is formed with an internal annular ledge 38 of reduced diameter as compared with the body of the cavity. This leads into a cylindrical bore 40.

The cover part 42 of the mold shown in Fig. 5, supports a taper core-pin 44 which projects axially into the mold cavity 36 of the body part 34 of the mold when the two are together. Dowel or guide pins (not shown) locate the taper core-pin axially in the mold cavity 36.

To form the rubber-base 24, the metal valve-stem tube 10 containing the apertured shield 12 is inserted in the mold part 34, Fig. 4, with the external shoulder 32 (Fig. 1) of the valve-stem tube resting on the annular ledge 38 in the mold cavity as shown in Fig. 6. It will be seen that the cylindrical bore 40 in the body part of the mold then receives the nipple end of the valve-stem tube; and that the basal portion of the valve-stem tube will be separated by an annular space from the wall of the mold cavity 36.

It will be understood that the foregoing mold is supposed to be equipped with the usual heating arrangements for operation as a vulcanizing mold. Moreover, in the following description, the rubber stock or compound and the mold are supposed to be heated to the proper temperatures.

A base of uncured rubber or rubber compound of suitable size, shape and composition having a hole pierced through its center is now pushed onto the core-pin 44 of the cover 42; and the cover is then applied as shown in Fig. 6, to the body part 34 of the mold, guided by dowel pins (not shown). As the cover (Fig. 6) approaches closing position the taper core-pin 44 enters the mouth or bore of the shield 12 and has already made a tight fit all around therewith. Continued closing of the mold forces the taper core-pin farther through the apertured shield into still tighter fit therewith, the metal of the shield surrounding the aperture being adapted to expand due to the forcible entry of the taper core-pin. This prevents the rubber compound from thereafter squeezing past the apertured shield closed by the core-pin. The complete closing of the mold forces the hot compound to fill completely all spaces in the mold whereby it fully embeds the basal portion of the valve-stem tube inside and out as shown in Fig. 2, and also forms the outwardly flanged foot or disc 24a, the surplus compound squeezing out from between the mold parts into the annular groove 41.

Vulcanizing heat and pressure are maintained on the article in the mold for a sufficient time to vulcanize the rubber base and cause it to adhere perfectly and become integrated with the embedded and other contacted metal parts.

The strength and perfection of this union are further increased due to the rubber base extending into the inside of the valve-stem tube and into the annular space 28 (Fig. 2) between the insert 12 and said tube, thus furnishing a large contact area between the rubber and the metal.

Permanent adhesion and air-tightness between the rubber and the valve-stem tube are further insured by the fact that when the stem is in use and subjected to the air pressure of the tire, this pressure acting against the rubber walls of the hole 26 in the composite valve-stem tends to compress the rubber and force it against the inside of the valve-stem tube 10, thus always tending to maintain the intimate contact between the rubber and the metal tube without acting to separate or pry or pull them apart. This is important, as one of the troubles encountered in rubber valve-stems heretofore is the gradual forcing away of the rubber from the metal part of the stem, brought about by the air pressure stretching the rubber and pulling it away from the metal, this being permitted because in such constructions the rubber is molded primarily only to the outside of the valve-stem tube.

Again, one of the main difficulties encountered in the molding of rubber to valve-stem tubes has been the leakage of the hot, fluid rubber at the joints between the tube and the mold. This is especially objectionable when the rubber escapes into the middle and outer interior of the tube since the escaped rubber sticks to the metal and is exceedingly difficult to remove. This trouble is entirely eliminated by the present invention which provides a tight joint between the metal parts of the valve-stem and the mold. Further, this tight joint is established before the mold is entirely closed, or in other words, before any considerable pressure is applied to the hot rubber. Moreover, the tightness of the joints is maintained during the molding and vulcanizing.

The foregoing, as already explained, is accomplished by making the core-pin 44 so as to slightly taper and by making the hole or bore in the shield 12 of such a size that the core-pin fits it tightly before the mold is entirely closed. This is the combination shown in Fig. 6. The core-pin is already bearing down on the shield and through it on the valve-stem tube. Therefore, further closing of the mold naturally presses the shoulder 32 of the valve-stem tube with increasing tightness against the annular ledge 38 of the mold cavity. This effectively prevents any leakage of rubber at this point, while the core-pin itself prevents any rubber from escaping past the apertured shield.

It will be noted that longitudinal channels are formed in the sides of the mold cavity (Fig. 4) separated by longitudinal ribs, and that this conformation molds corresponding longitudinal ribs 46 and channels 48 in the outside of the substantially cylindrical or slightly tapering boss-portion 24b of the rubber-base. These channels 48 serve to permit any air to escape that would otherwise be trapped between the inner tube and the tire casing or shoe while the tube is being inflated. In other words, the ribs 46 prevent the rubber-base from completely closing up the hole in the rim 50, Fig. 9, so that the air can escape from the shoe during the inflation of the inner tube instead of being trapped in the casing.

Fig. 7 shows a fragment of an inner tube 52 to which one of my rubber-base valve-stems has been vulcanized. A preferred form of union is to rubber cement the rubber foot 24a of the composite valve-stem to the wall of the uncured inner tube, all being properly supported in connection with a vulcanizing mold suitable for vulcanizing inner tubes. The operation of vulcanizing the inner tube simultaneously vulcanizes the base 24a of the valve-stem to the inner tube.

The rubber-base and the inner tube are made from different compounds. The former is compounded so as to cure and adhere as perfectly as possible to the metal parts and takes a much longer time to cure than the inner tube compound. In practice I proceed as follows:—the rubber-base is at first incompletely cured in the mold 34—42; and then its vulcanization is completed after it has been rubber cemented to the uncured inner tube as above described. Thus the curing of the rubber-base is completed simultaneously with the curing of the inner tube. Doing it in that way prevents the rubber-base from being overcured.

Fig. 7 also shows an improved dust cap of my invention especially adapted for use with the composite valve-stem. This cap may be formed from sheet-metal. Its closed end is shown internally screw threaded at 60 for engaging the threads on the nipple 18 of the valve-stem. The dust cap opening at the base is adapted to receive snugly into it the preferably substantially cylindrical or slightly tapered portion 24b of the rubber-base which squeezes into it with a tight circumferential fit when the dust cap is screwed into place. Thus, an air, dust, and water-tight joint is made between the cap and the rubber-base at 62.

Fig. 8 shows the closed end portion of another dust cap 64 within my invention, the skirt or body portion of which may be the same as in Fig. 7. Like the other cap it also has internal screw threads 66 to engage the threaded nipple 18 of the composite valve-stem. The closed end of this dust cap in Fig. 8 is formed with a substantially cylindrical portion 68 of somewhat enlarged diameter compared to the screw threaded portion 66 so as to provide an annular shoulder 70. This cylindrical portion 68 is roofed over integrally by the conical portion 72. A recess is thus provided in the closed end of this cap above the shoulder 70 which approximates the combined shape of a cone superposed on a cylinder. Loosely confined within this recess retained by said shoulder, is a washer 74. This washer consists of a rubber body 74a molded and cured inside a metal shell 74b so that the two are integrated. The general form of the washer is cylindrical with a substantially conical upper portion 74c. The rubber body 74a projects beyond the mouth of the shell 74b and under the wall thereof as shown. The conical portion 74a of the washer has its point directed into the conical roof 72 of the dust cap, the internal angle of said roof approximating a right angle.

When the described dust cap Fig. 8 is screwed onto the composite valve-stem, the mouth of the nipple 18 bears against the under side of the washer, lifts it off the shoulder 70 and forces its point into the center of the conical roof 72 of the dust cap. After this the washer need not turn or rotate with the dust cap but becomes seated more and more tightly against the mouth of the nipple 18 by the screwing on of the dust cap. The rubber body of the washer may be hollowed out as indicated by the dotted line 76 so that the washer does not interfere with the upper end of the valve pin (not shown) of the valve insides.

The washer is slightly smaller in all directions than the recess so as to be free to come to a square seating against the nipple of the valve-stem. The washer is prevented from assuming an unduly tilted position in the containing recess because before it can do so, its cylindrical body peripherally strikes the adjacent wall of the recess which stops further tilting. When the dust cap is screwed into place the apex of its conical roof bears down on the point of the washer and forces the washer into sealing contact with the nipple.

The sides of the metal shell preferably taper slightly from a true cylinder towards the top of the washer. The diameter of the body of the washer relative to the diameter of the inside of the dust cap at the screw threads 66 is such that the washer can be forcibly pushed past said screw threads. In so doing the washer contracts slightly diametrically, but expands as soon as it has been forced above the annular shoulder 70 into the recess in the closed end of the dust cap. Thereafter the washer is retained from dropping out of the recess by the shoulder 70.

In the dust cap of Fig. 8, the washer maintains the air-seal; and the joint at 62 (Fig. 7) between the mouth of the cap and the rubber-boss of the valve-stem is only relied on to keep out water and dirt.

This type of dust cap, Figs. 7 and 8 is usable in connection with my composite valve-stem when no rim-nut is used.

Fig. 9 shows the composite valve-stem on an inner tube 52 in use in connection with a wheel-rim 50 and a tire-casing or shoe 56. It also shows how a rim-nut 78 may be used with this valve stem if desired.

The illustrated rim is of the drop center type with corner outlet 50a but my composite valve-stem is adapted to be used with any desired or preferred type of rim.

The illustrated rim-nut is made out of sheet stock but may be made of solid stock if desired. The nut has internal screw-threads for engaging the screw-threads 20 on the body of the valve-stem; has its body portion 78a hexed or formed with flat wrench-engageable faces; and a foot portion for engaging the mouth of the outlet 50a of the wheel-rim 50. Tightening the rim-nut secures the composite valve-stem firmly in place in the outlet 50a of the wheel-rim. The body portion of the rubber-base 24 of the valve-stem is normally larger than the bore of the outlet 50a, and besides both preferably taper so that tightening the rim-nut results in a jam fit between the parts. The ribs 46 however keep the channels 48 open.

Among the advantages of this valve-stem are the following:

1. Base-leaks are eliminated.
2. A rim-nut can be used with this stem which holds the stem in place in the rim when the tube is deflated and when the air chuck is applied to inflate the tube. Rim nuts ordinarily are not usable with other rubber valve-stems.
3. The inner tubes equipped with this valve-stem are not injured when the tires are driven without air. When the conventional stem is used, the tube is generally badly cut by the bridge washer or the stem is torn from the tube, if driven flat for even a short distance.
4. The metal-tube portion of my composite valve-stem, being electro-plated, gives it the pleasing appearance of the usual metal valve-stem.

It is to be understood that this invention is not limited to the specific constructions herein shown and described, as it is evident that various changes might be made in applying the invention without departing from the spirit of the invention or the scope of the appended claims.

What I claim is:

1. A valve-stem comprising a valve-stem tube, a flexible rubber-base therefor in which one end of the valve-stem tube is embedded inside and out, a tubular insert which in part snugly fits the bore of the valve-stem tube but has a lower portion separated by an annular space from the inside of the tube, the rubber-base material extending inside the valve-stem tube into the aforesaid annular space, there being a substantially axial hole through the rubber base connecting with the bore of the tubular insert.

2. In combination, a wheel-rim having a valve-stem outlet, a composite valve-stem comprising a rubber-base supporting a metallic valve-stem tube and having a body portion externally surrounding the basal portion of said tube, said body portion of said rubber-base compressibly fitting said outlet; and a rim-nut screw-threaded on the tube and engageable with the wheel-rim outlet.

LEWIS C. BROECKER.